3,335,189
PROCESS FOR THE PRODUCTION OF POLYETHER-THIOETHERS

Eberhart Degener, Leverkusen, Hans-Georg Schmelzer, Cologne-Stammheim, and Hans Holtschmidt, Leverkusen, Germany, assignors to Farbenfabriken Bayer Aktiengesellschaft, Leverkusen, Germany, a German corporation
No Drawing. Filed Apr. 27, 1964, Ser. No. 362,932
Claims priority, application Germany, May 11, 1963, F 39,712
2 Claims. (Cl. 260—609)

In United States Patent 3,135,804, a process for the production of polyether-thioether is described according to which dihydroxyalkyl sulphides are heated with oxalkylation products of aliphatic monoalcohols in the presence of compounds which have an acidic reaction or which form acids. The polyether-thioethers obtained by this method correspond to the general formula

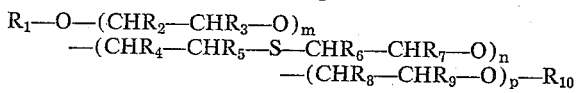

wherein $R_1$ and $R_{10}$ denote linear or branched alkyl radicals with 1 to 22, preferably 3 to 18 carbons atoms, and $R_2$, $R_3$, $R_4$, $R_5$, $R_6$, $R_7$, $R_8$ and $R_9$ represent hydrogen and/or the same or different linear or branched alkyl radicals with 1 to 12 carbon atoms, whilst $m$, $n$ and $p$ are whole numbers from 1 to 10, preferably 1 to 5. By way of compounds which have an acidic reaction or which form acids, mention is made, inter alia, of phosphorus compounds, actually those derived from pentavalent phosphorus, such as orthophosphoric acid in particular.

The object of the present invention is an improvement of the above mentioned process. It consists in the use of compounds of trivalent phosphorus, namely phosphorous acid and its salts as well as phosphorous acids and derivatives of these acids, as the compounds which have an acidic reaction or which form acids.

Suitable derivatives of phosphorous acid are, for example, the halides, the mono-, di- and tri-esters as well as the amides and ester-amides; mention may for instance be made of ammonium hydrogen phosphite, phosphorus trichloride, monomethyl phosphite, monoethyl phosphite, monoisopropyl phosphite, dimethyl phosphite, diethyl phosphite, diphenyl phosphite, triethyl phosphite, triphenyl phosphite, phosphorous acid diethyl ester-chloride, phosphorous acid-bis-(dimethylamide), phosphorous acid-tris-(dimethylamide), phosphorous acid-bis-(dimethylamide)-chloride, and phosphorous acid ethyl ester-dimethylamide-chloride.

Suitable derivatives of the phosphonous acids are again their halides, esters, amides and ester-amides; suitable phosphonous acids and their derivatives are, for instance, ethane-phosphonous acid, benzene-phosphonous acid, ethane-phosphonous acid dichloride and ethane-phosphonous acid ethyl ester-dimethylamide.

The proportions of the compounds which have an acidic reaction or which form acids to be employed in accordance with the invention are 0.01 to 5%, preferably 0.1 to 1.5% (referred to the weight of the reaction components).

In this connection, the following may be mentioned as examples of dihydroxyalkyl sulphides: thiodiglycol, $\beta$, $\beta'$-dimethyl-thiodiglycol, $\beta$-ethyl-thiodiglycol, $\beta,\beta'$-diethyl-thiodiglycol, and also the products with 1 to 4 sulphur atoms formed by the self-condensation of these dihydroxyalkyl sulphides, such as for instance, 1,11-dihydroxy-(3, 9-dithia-6-oxa)-undecane. Suitable oxalkylation products of aliphatic monoalcohols are, for instance, the monomethyl, monoethyl, monopropyl, monobutyl, monoisobutyl, monoheptyl, monododecyl, monoisododecyl and monocetyl ethers of mono-, di-, tri- or tetraethylene glycol, of mono-, di-, tri-, tetra- or deca-propylene glycol as well as the monoalkyl ethers which are obtainable by the simultaneous or successive action of ethylene and propylene oxide on aliphatic monoalcohols.

The proportions by weight at which the dihydroxyalkyl sulphides and the oxalkylation products of aliphatic monoalcohols are condensed with one another may vary within wide limits; suitable proportions by weight can readily be established by experiment.

In general, it is recommended to apply the dihydroxyalkyl sulphides and the oxalkylation products of the aliphatic monoalcohols at a molar ratio of 1:5 to 5:2.

For carrying out the process, the components are heated at temperatures between 100 and 220° C., preferably at temperatures between 140 and 200° C.; heating is preferably continued until the etherification of the hydroxy groups of the dihydroxyalkyl sulphides is practically complete. The reaction mixture is subsequently neutralised, and where necessary unreacted starting materials are washed out or distilled off.

In comparison with the phosphorus compounds derived from pentavalent phosphorus the compounds derived from trivalent phosphorus to be employed in accordance with the present invention considerably increase the rate at which the condensation proceeds, and at the same time largely prevent the formation of undesirable side products. In addition, it is worth noting that the products of the process which are obtained when the present invention is carried out do not exhibit any discolouration; this is a particular advantage when the polyether-thioethers are intended for application as plasticisers.

The following example serves to illustrate the invention without, however, limiting its scope. The "parts" specified therein are parts by weight.

Example 900 parts of diethylene glycol monobutyl ether, prepared by the action of ethylene oxide on n.butanol at a molar ratio of 2:1 in the presence of sodium butoxide, 310 parts of thiodiglycol and 7.5 parts of phosphorous acid are heated in a distilling apparatus at 185° C. for 11 hours whilst carbon dioxide is passed through it; during this operation, 100 parts of water are distilled off. The condensation is then continued at 185° C. and at 20 mm. Hg for another 3 hours. The reaction mixture is thereafter neutralised at 80 to 90° with dilute sodium hydroxide solution and subjected to steam distillation at 120° C. for 4 to 5 hours. The reaction product is subsequently distilled at 0.1 mm. Hg until the temperature has risen to 110° C. About 1060 parts of a non-viscous oil remain, and after it has been filtered it exhibits the following data.

Colour indices:
- APHA — 200
- Gardner — <1

Density at 20° C. — 1.061
Viscosity at 50° C. — E 2.6
Flash point — °C 233

Lubricating characteristics:
- (a) tested on an Almen-Wieland test machine, pressure applied — kg >2000
- (b) Four-ball apparatus according to Boerlage bonding load — kg 380
- (c) FZG-Test[1] (gear test, Test A) load stage attained — 12

Wear mg./HP-hr. — <0.1
Corrosion test Cu strip, 80 hours at 100° C.: negative.

[1] Forschung für Zahnrad- und Getriebebau (an Institute of Munich University).

When 7.5 parts of orthophosphoric acid are employed in place of the 7.5 parts of phosphorous acid, the resultant polyether-thioether exhibits the colour indices:

APHA (undiluted) — >500
APHA (diluted 1:10 with methanol) — 300
Gardner — 10

When the progress of the decrease of the OH index is followed during the condensation by volumetric analysis, it is found that the etherification with phosphorous acid proceeds at a faster rate than with orthophosphoric acid. After condensation has lasted for 5 hours, the condensation product prepared in the presence of phosphorous acid has an OH index of 32, whereas the condensation product prepared during the same time in the presence of orthophosphoric acid still has an OH index of 79.

We claim:

1. In the process of producing a polyether-thioether having the formula:

$$R_1-O-(CHR_2-CHR_3-O-)_m-(CHR_4-CHR_5-S-CHR_6-CHR_7-O)_n-CHR_8-CHR_9-O)_p-R_{10}$$

wherein $R_1$ and $R_{10}$ are members selected from the group consisting of linear and branched alkyl radicals containing 3 to 18 carbon atoms; $R_2$, $R_3$, $R_4$, $R_5$, $R_6$, $R_7$, $R_8$ and $R_9$ denote a member selected from the group consisting of hydrogen, linear and branched alkyl radicals of 1 to 12 carbon atoms; and $m$, $n$ and $p$ are whole numbers from 1 to 10; comprising heating an alkoxylation product of the formula:

$$R_1-O-(CHR_2-CHR_3-O)_mH$$

and an alkoxylation product of the formula:

$$R_{10}-O-(CHR_8-CHR_9-O)_p-H$$

with a dihydroxy alkyl sulfide of the formula:

$$OH-CHR_4-CHR_5-S-CHR_6-CHR_7-OH$$

in the presence of a catalytic amount of an acid catalyst, the improvement wherein said catalyst is selected from the group consisting of phosphorous acid, phosphorous acid halides, phosphorous acid esters and phosphorous acid ester amides, said heating is carried out at a temperature between 100 and 220° C. and the molar ratio of said dihydroxy alkyl sulfide reactant to said total alkoxylation product reactants is from 1:5 to 5:2.

2. The method of claim 1 wherein diethylene glycol monobutyl ether and thiodiglycol are heated in the presence of a catalytic amount of phosphorous acid.

References Cited

UNITED STATES PATENTS 3,135,804   6/1964   Brachel et al. _____ 260—609

CHARLES B. PARKER, *Primary Examiner.*

DELBERT R. PHILLIPS, *Assistant Examiner.*